(12) United States Patent
Nakano

(10) Patent No.: US 8,477,257 B2
(45) Date of Patent: Jul. 2, 2013

(54) LIQUID CRYSTAL MODULE AND DISPLAY DEVICE

(75) Inventor: Kodai Nakano, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 293 days.

(21) Appl. No.: 12/969,628

(22) Filed: Dec. 16, 2010

(65) Prior Publication Data

US 2011/0149194 A1 Jun. 23, 2011

(30) Foreign Application Priority Data

Dec. 22, 2009 (JP) ................................ 2009-290587

(51) Int. Cl.
 *G02F 1/1333* (2006.01)
(52) U.S. Cl.
 USPC ............................................ 349/58; 362/633
(58) Field of Classification Search
 USPC ................. 349/58, 65, 67, 69; 362/97.2, 632, 362/633, 634, 611, 614, 609
 See application file for complete search history.

(56) References Cited

U.S. PATENT DOCUMENTS

| | | | | |
|---|---|---|---|---|
| 7,545,453 | B2 * | 6/2009 | Kim ................................ | 349/58 |
| 2004/0227870 | A1 | 11/2004 | Jang | |
| 2006/0284808 | A1 * | 12/2006 | Fukuda ........................... | 345/89 |
| 2010/0302457 | A1 | 12/2010 | Yamamoto et al. | |

FOREIGN PATENT DOCUMENTS

| | | |
|---|---|---|
| EP | 2 083 313 A1 | 7/2009 |
| EP | 2 103 986 A | 9/2009 |
| JP | 11-190835 A | 7/1999 |
| JP | 2002-116430 A | 4/2002 |
| JP | 2003-107434 A | 4/2003 |
| JP | 2003-157021 A | 5/2003 |
| JP | 2006-350216 A | 12/2006 |
| JP | 2009-036963 A | 2/2009 |
| JP | 2009-176544 A | 8/2009 |

OTHER PUBLICATIONS

European Search Report of corresponding EP Application No. 10 19 6061.5 dated Jul. 8, 2011.
Partial European Search Report of corresponding EP Application No. 10 19 6061.5 dated Apr. 27, 2011.

* cited by examiner

*Primary Examiner* — Thoi Duong
(74) *Attorney, Agent, or Firm* — Global IP Counselors (57) ABSTRACT

A liquid crystal module includes a rear frame, a lamp frame, a liquid crystal panel and a bezel. The rear frame has a bottom plate, a side plate and a flange. The flange has a first screw insertion hole. The lamp frame is fixedly attached to the rear frame along the side plate of the rear frame. The lamp frame has a lamp frame top plate that is disposed on the flange of the rear frame. The lamp frame top plate has a second screw insertion hole. The bezel is fixedly attached to the rear frame. The bezel has a bezel top plate that is disposed on the lamp frame top plate of the lamp frame. The bezel top plate has a third screw insertion hole. The first, second and third screw insertion holes are aligned each other as viewed from a center axis of the first screw insertion hole.

12 Claims, 7 Drawing Sheets

LIQUID CRYSTAL MODULE AND DISPLAY DEVICE

CROSS-REFERENCE TO RELATED APPLICATIONS

This application claims priority to Japanese Patent Application No. 2009-290587 filed on Dec. 22, 2009. The entire disclosure of Japanese Patent Application No. 2009-290587 is hereby incorporated herein by reference.

BACKGROUND

1. Field of the Invention

The present invention generally relates to a liquid crystal module. More specifically, the present invention relates to a liquid crystal module that is installed in a display device.

2. Background Information

A conventional liquid crystal module has a rear frame, a light reflecting sheet, a linear light source (e.g., a cold cathode tube), a pair of lamp frames, an optical sheet, a liquid crystal panel and a bezel. The light reflecting sheet and the linear light source are disposed inside the rear frame. The lamp frames are provided along left and right sides of the rear frame. The optical sheet and the liquid crystal panel are disposed at a top end opening of the rear frame. The bezel surrounds four edge portions of the liquid crystal panel. With the conventional liquid crystal module, attachment tabs each having a screw insertion hole for screwing and attaching the liquid crystal module to a cabinet of an electronic device are formed by cutting lower parts of side plates of left and right bezels, lifting the parts outward at a right angle, and punching out the screw insertion hole.

Meanwhile, with a conventional liquid crystal display device, protrusions are formed on left and right outer faces of a top case of a liquid crystal module. Fixing components having L-shaped fixing grooves are formed on left and right inner faces of a rear case. The protrusions of the liquid crystal module are mated with L-shaped fixing grooves of fixing components of the rear case (see Japanese Laid-Open Patent Application Publication No. 2003-107434, for example).

Furthermore, with a conventional liquid crystal module fixing structure, seats are erected on left and right sides of a base frame. Fixing parts are attached to left and right side faces of a liquid crystal module. The seats and the fixing parts are screwed together to fix the liquid crystal module to the base frame (see Japanese Laid-Open Patent Application Publication No. 2003-157021, for example).

SUMMARY

It has been discovered that, with the conventional liquid crystal module, since the attachment tabs protrude from the left and right bezels, in the case of an SKD (e.g., semi-knock down) model, when the product is put in an antistatic bag and shipped, a problem is that the attachment tabs sticking out from the bezels tear the antistatic bag, or the attachment tabs are deformed by vibration or impact during transport. Also, it has been discovered that, with the conventional liquid crystal module, since the attachment tabs are sticking out from the bezels, the attachment tabs get in the way and make the liquid crystal module more difficult to handle. Furthermore, since the size of the liquid crystal module is made bulkier by the attachment tabs, another problem is that a larger storage space is necessary.

It has been discovered that, with the conventional liquid crystal display device, the same problems as described above are encountered because the protrusions are formed on the left and right side faces of the liquid crystal module. Furthermore, it has been discovered that, with the conventional liquid crystal module fixing structure described above, since the fixing parts are attached to the left and right side faces of the liquid crystal module and then these fixing members and the left and right seats of the base frame are screwed down, a problem is that more parts are required and assembly work is more complicated.

An improved liquid crystal module was conceived in light of the above-mentioned problem. One object of the present disclosure is to provide a liquid crystal module with which size of the liquid crystal module can be reduced.

In accordance with one aspect of the present disclosure, a liquid crystal module includes a rear frame, a lamp frame, a liquid crystal panel and a bezel. The rear frame has a bottom plate, a side plate and a flange. The side plate extends from a short side portion of the bottom plate forward of the rear frame relative to the bottom plate. The flange extends from a top edge portion of the side plate outward of the rear frame relative to the side plate. The flange has a first screw insertion hole. The lamp frame is fixedly attached to the rear frame along the side plate of the rear frame. The lamp frame has a lamp frame top plate that is disposed on the flange of the rear frame. The lamp frame top plate has a second screw insertion hole. The liquid crystal panel is disposed above the rear frame. The bezel is disposed around an edge portion of the liquid crystal panel and fixedly attached to the rear frame. The bezel has a bezel top plate that is disposed on the lamp frame top plate of the lamp frame. The bezel top plate has a third screw insertion hole. The first, second and third screw insertion holes are aligned each other as viewed from a center axis of the first screw insertion hole.

With the liquid crystal module, it is possible to provide a liquid crystal module with which size of the liquid crystal module can be reduced.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from these disclosures that the following descriptions of the preferred embodiment are provided for illustration only and not for the purpose of limiting the invention as defined by the appended claims and their equivalents.

Figure 8:
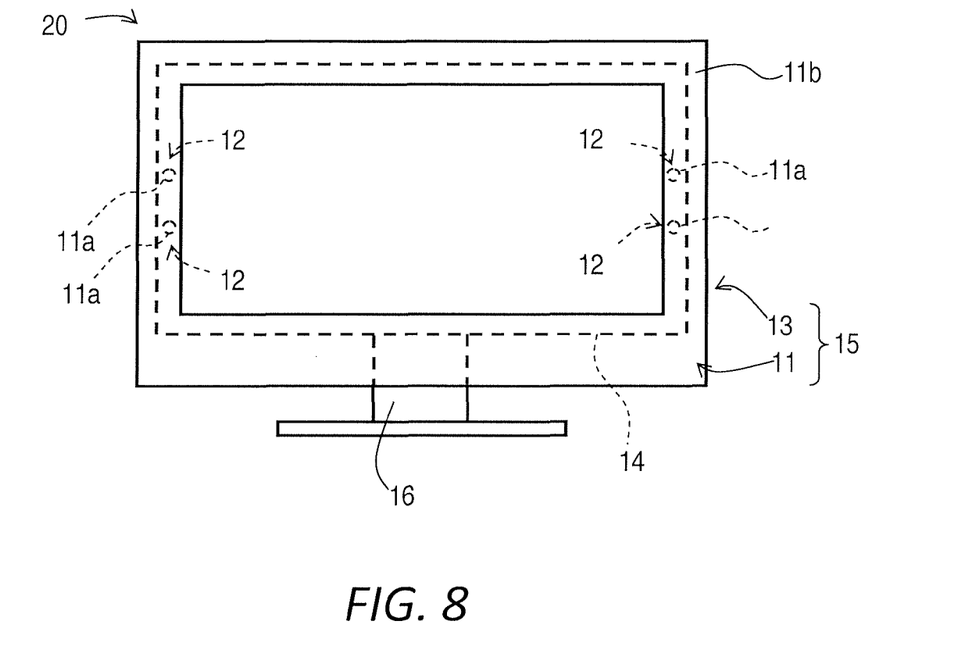
FIG. 8 is a front elevational view of the display device in accordance with one embodiment.

FIG. 8 illustrates a flat panel display device (e.g., display device) 20. The flat panel display device 20 is used as a television set, a computer display, or other electric device. The flat panel display device 20 includes a liquid crystal module 14, a cabinet 15 with front and rear cabinets 11 and 13 and a stand 16. The liquid crystal module 14 is fixed on the stand 16. The liquid crystal module 14 is covered with the cabinet 15. Specifically, the liquid crystal module 14 is disposed within an inside space of the cabinet 15 that is defined between the front cabinet 11 and the rear cabinet 13. The stand 16 is fixedly coupled to the cabinet 15. The liquid crystal module 14 is fixedly coupled to the front cabinet 11 with screws 12. The front cabinet 11 is rectangular when viewed from a front side of the flat panel display device 20, and is made of synthetic resin. The front cabinet 11 is integrally formed as a one-piece, unitary member. The front cabinet 11 has four bosses 11a and a front panel 11b. The bosses 11a have threaded holes into which the screws 12 are screwed to fixedly couple the liquid crystal module 14 to the front cabinet 11, respectively. The bosses 11a protrude rearward of the front cabinet 11 relative to the front panel 11b. The rear cabinet 13 is coupled to a rear side of the front cabinet 11, and is made of synthetic resin. The rear cabinet 13 is integrally formed as a one-piece, unitary member.

Figure 1:
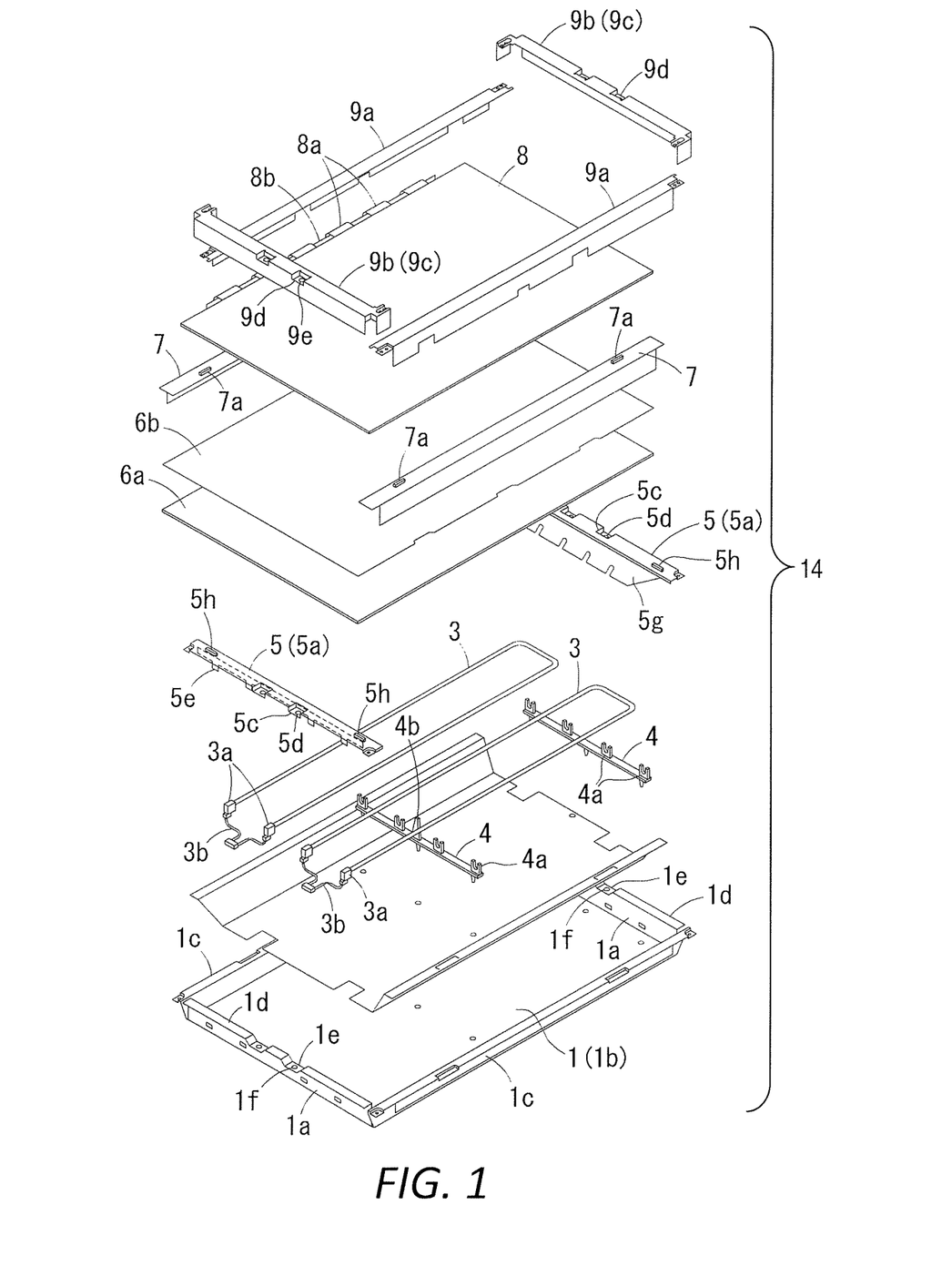
FIG. 1 is an exploded perspective view of a liquid crystal module in accordance with one embodiment.

Referring to FIGS. 1 to 7, the liquid crystal module 14 will be described in detail. As seen in FIG. 1, the liquid crystal module 14 mainly includes a rear frame 1, a light reflecting sheet 2, a pair of U-shaped cold cathode tubes (e.g., light sources) 3, a pair of lamp holders 4, a pair of lamp frames 5, a plurality of optical sheets 6a and 6b, a pair of cell guides 7, a liquid crystal panel 8 and a plurality of bezels 9a and 9b.

The rear frame 1 is a shallow box-shaped frame made by bending sheet metal. The rear frame 1 is integrally formed as a one-piece, unitary member. The rear frame 1 mainly includes a pair of short side plates (e.g., side plate) 1a, a bottom plate 1b and a pair of double-walled long side plates (hereinafter "double-walled side plates") 1c. The side plates 1a extends upward (forward) from short side edge portions of the bottom plate 1b relative to the bottom plate 1b. The double-walled side plates 1c extends upward from long side edge portions of the bottom plate 1b.

The light reflecting sheet 2 is provided on the bottom plate 1b inside the rear frame 1. The U-shaped cold cathode tubes 3 are installed in parallel as linear light sources above the light reflecting sheet 2 inside the rear frame 1. The U-shaped cold cathode tubes 3 are supported by the lamp holders 4. Each of the lamp holders 4 has a plurality of support components 4a into which the U-shaped cold cathode tubes 3 are fitted and held. One of the lamp holders 4 has a post 4b that holds up the optical sheet 6a from below and prevents sagging. The post 4b is formed on the lamp holder 4 that supports center part of the U-shaped cold cathode tubes 3.

Lamp sockets 3a are attached to end portions of the U-shaped cold cathode tubes 3. The lamp sockets 3a are fitted into socket fitting openings (not shown) formed in the bottom plate 1b of the rear frame 1 along the short side plate 1a (the right side plate in FIG. 1) on one short side of the rear frame 1. Lead wires 3b of the U-shaped cold cathode tubes 3 are taken out from the lamp sockets 3a to the rear side of the rear frame 1.

The lamp frames 5 are made of a synthetic resin. The lamp frames are fixedly attached to the rear flame 1. The lamp frames 5 are disposed above the bottom plate 1b on inside of the short side plates 1a formed on the left and right short sides of the rear frame 1. The lamp frames 5 are disposed along the left and right short sides of the rear frame 1. Curved parts of the U-shaped cold cathode tubes 3 on the opposite side from the end portions are disposed behind one of the lamp frames 5, which prevents uneven brightness at the left and right sides of the display face of the liquid crystal panel 8. The liquid crystal panel 8 is configured to display image on the display face.

Figure 3:
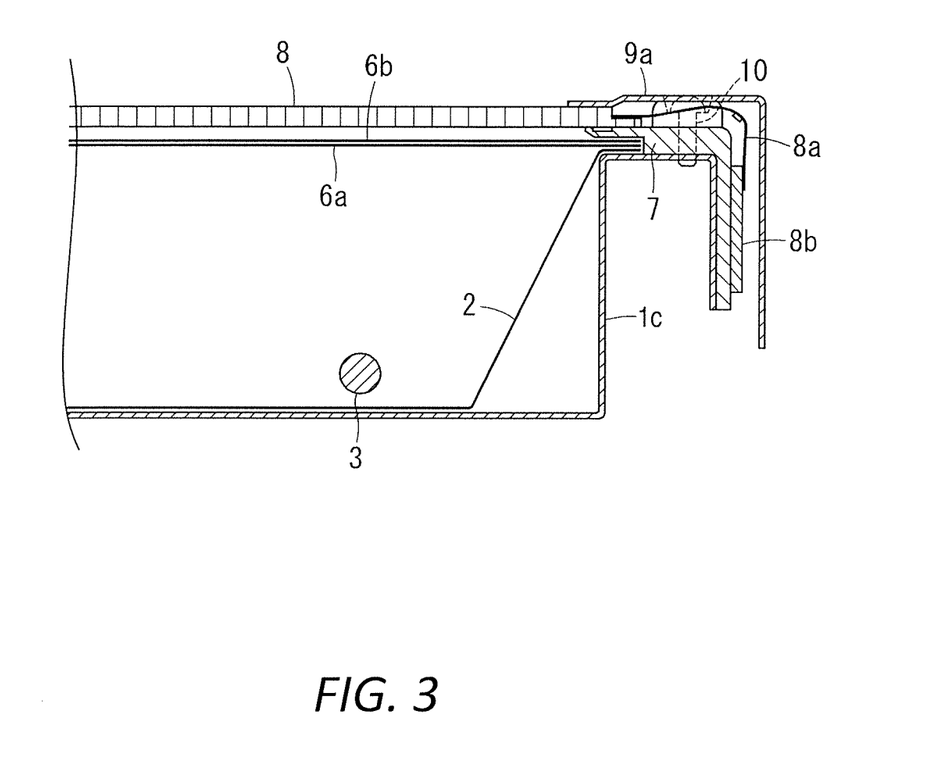
FIG. 3 is a partial cross sectional view of the liquid crystal module taken along III-III line in FIG. 2.
Figure 4:
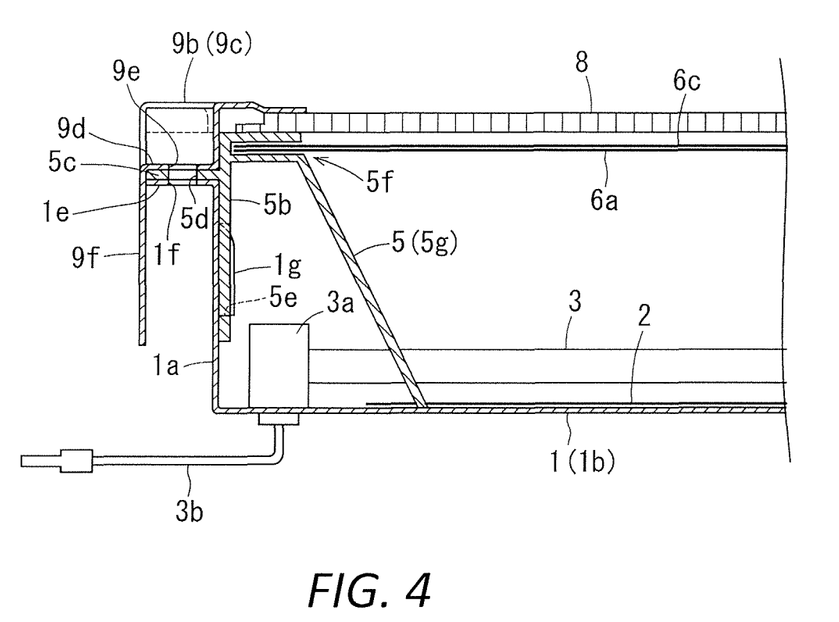
FIG. 4 is a partial cross sectional view of the liquid crystal module taken along IV-IV line in FIG. 2.
Figure 5:
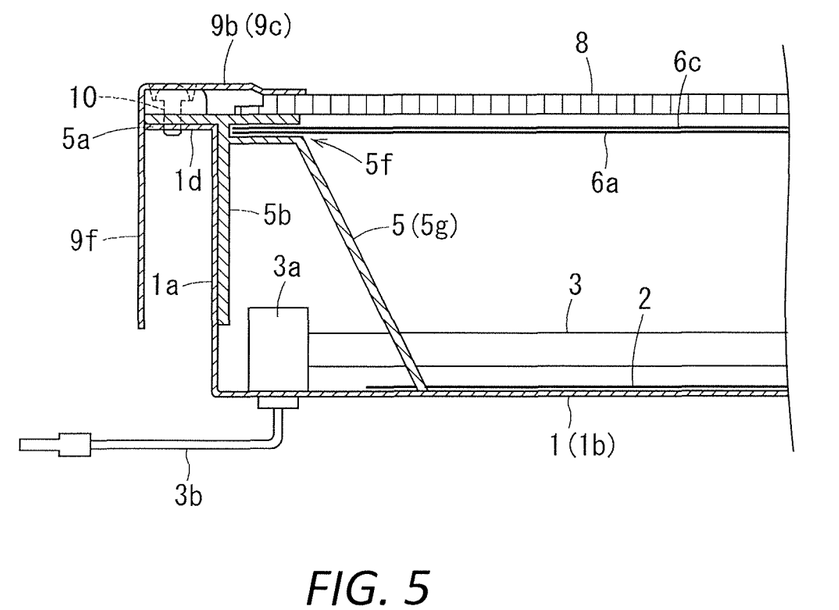
FIG. 5 is a partial cross sectional view of the liquid crystal module taken along V-V line in FIG. 2.

The optical sheets (e.g., light diffusing sheets) 6a and 6b are disposed at the upper end opening (e.g., top end opening) of the rear frame 1 above the U-shaped cold cathode tubes 3. The end edges along the long sides of the optical sheets 6a and 6b are disposed on the double-walled side plates 1c. The double-walled side plates 1c are formed by bending along the long sides of the rear frame 1 in an inverted U shape. As seen in FIG. 3, the end edges along the long sides of the optical sheets 6a and 6b are held down by the cell guides 7. The cell guides 7 are made of a synthetic resin. Furthermore, as seen in FIGS. 4 and 5, the end edges along the short sides of the optical sheets 6a and 6b are inserted into grooves 5f formed at the upper ends of the lamp frames 5.

Figure 2:
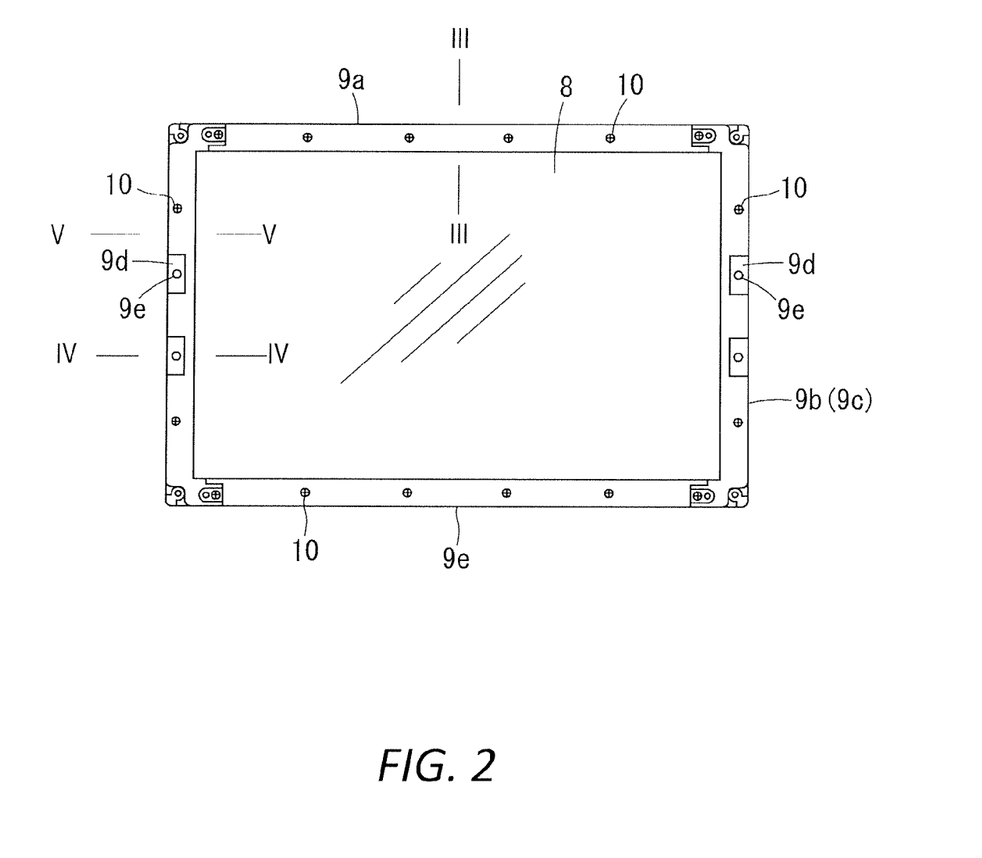
FIG. 2 is an front elevational view of the liquid crystal module illustrated in FIG. 1.

The liquid crystal panel 8 is disposed above the optical sheets 6a and 6b at the upper end opening of the rear frame 1. As seen in FIGS. 3, 4 and 5, the end edges on the four sides of the liquid crystal panel 8 are disposed on the top faces of the lamp frames 5 and the cell guides 7. Four (two long and two short) bezels 9a and 9b made of sheet metal are linked in a square shape. The bezels 9a and 9b surround the side plates on the four sides of the rear frame 1 and the end edges (e.g., edge portions) on the four sides of the liquid crystal panel 8. The bezels 9a and 9b are fixed to the left and right side plates 1a and the double-walled side plates 1c on the four sides of the rear frame 1 with screws 10 as seen in FIGS. 2, 3, and 5. As seen in FIGS. 1 and 3, an X-wiring board 8b is connected via a chip-on-film 8a to the end edge of the liquid crystal panel 8, and the X-wiring board 8b is fixed to the side faces of the cell guides 7. The liquid crystal panel 8 is positioned by positioning convex components 7a and 5h formed on the upper faces of the cell guides 7 and the lamp frames 5, respectively.

Figure 6:
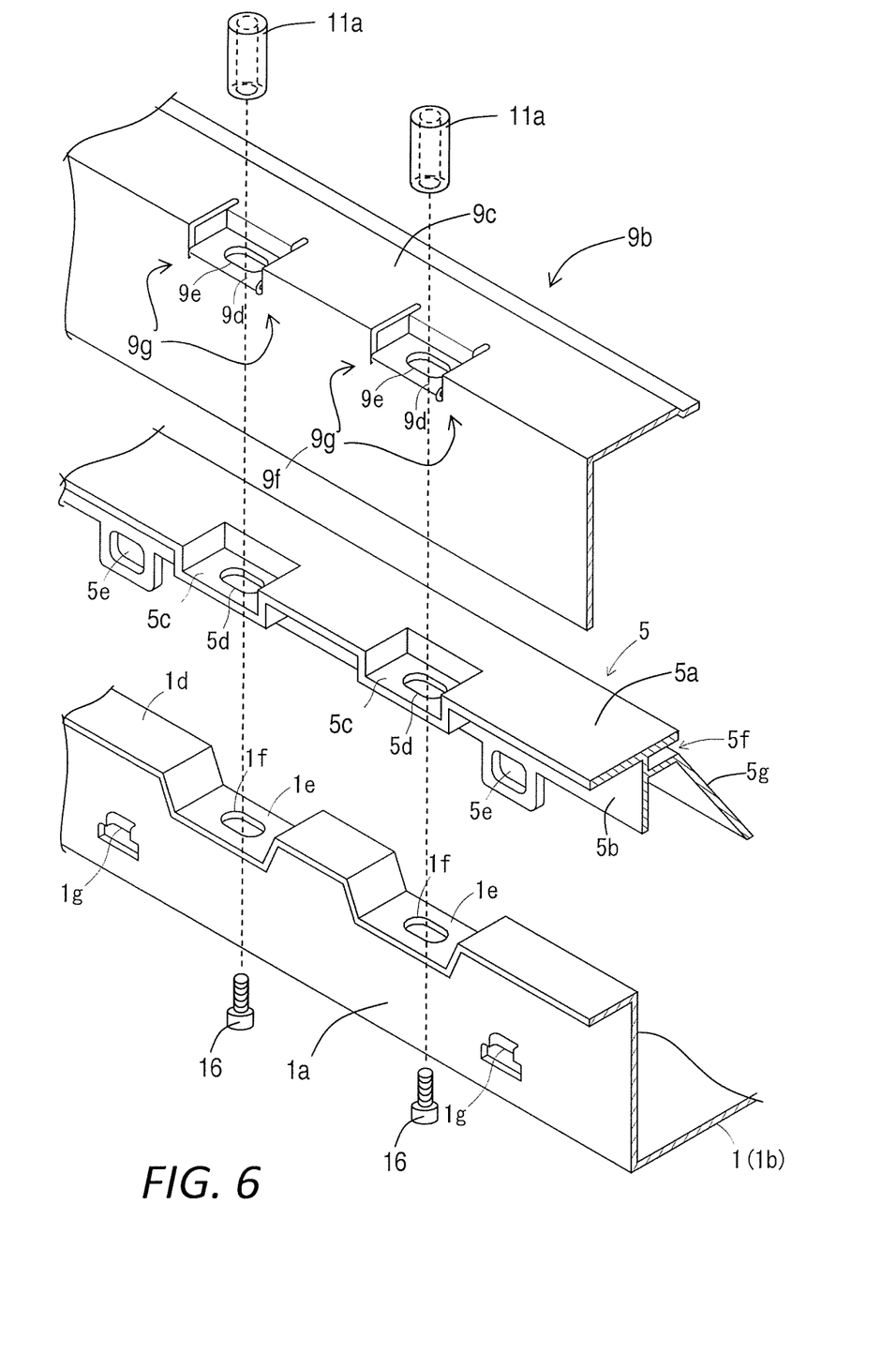
FIG. 6 is a enlarged, partial exploded perspective view of the liquid crystal module illustrating an attachment structure of the liquid crystal module relative to a cabinet of a display device.
Figure 7:
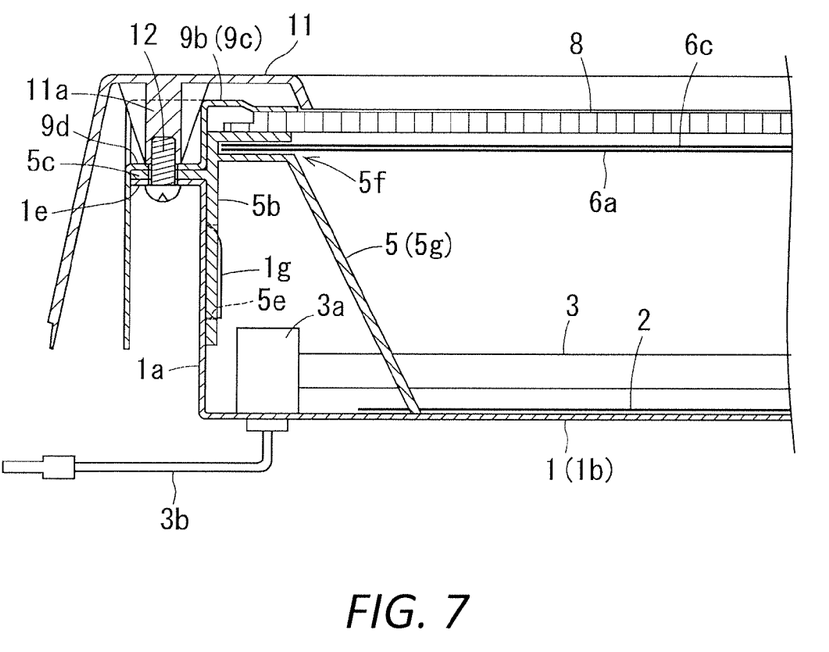
FIG. 7 is a partial cross sectional view of the liquid crystal module illustrating an attached state of the liquid crystal module to the cabinet of the display device.

As seen in FIGS. 1 and 6, the rear frame 1 has a pair of flanges 1d. The flanges 1d are formed by bending upper end edge portions of the left and right side plates 1a of the rear frame 1 outward of the rear frame 1. The flanges 1d extend from top edge portion of the side plates 1a outward of the rear flame 1 relative to the side plates 1a, respectively. Each of the flanges 1d has a pair of concave components (e.g., first concave components) 1e. The concave components 1e are formed at two specific places near the center in the lengthwise direction of the flanges 1d. As seen in FIG. 7, the concave components 1e have screw insertion holes (first screw insertion holes) 1f for inserting the screws 12, respectively. The screw insertion holes 1f are punched out from bottom portions of the concave components 1e, respectively. The screws 12 attach the liquid crystal module 14 to the bosses 11a on a rear face of the front cabinet 11 of the cabinet 15. A plurality of hooks 1g that inwardly curves into the inside of the rear frame 1 is formed at spaced apart locations on the left and right side plates 1a.

Each of the lamp frames 5 has a top plate (e.g., lamp frame top plate) 5a, rear face plate 5b and a pair of concave components (e.g., second concave components) 5c. The top plates 5a are disposed on the flanges 1d, respectively. The rear face plate 5b extends rearward of the rear frame 1 from the top plate 5a. The concave components 5c are formed at two specific places near the center in the lengthwise direction of the top plate 5a. The concave components 5c fit into the concave components 1e of the flanges 1d, respectively. The concave components 5c have screw insertion holes (e.g., second screw insertion holes) 5d for inserting the screws 12, respectively. The screw insertion holes 5d are punched out from bottom portions of the concave components 5c, respectively. A plurality of engagement openings 5e that engages with the hooks 1g of the left and right side plates 1a is formed at lower end portions of the rear face plates 5b. As seen in FIG. 6, the lamp frames 5 have grooves 5f for inserting end edge portions of the optical sheets 6a and 6b, respectively. The lamp frames 5 also have inclined plate portions 5g that cover curved parts or end portions of the U-shaped cold cathode tubes 3, respectively.

Each of the left and right bezels 9b has a top plate (e.g., bezel top plate) 9c, a side plate (e.g., bezel side plate) 9f, and a pair of concave components (e.g., third concave components) 9d. The top plates 9c are disposed on the top plates 5a, respectively. The concave components 9d are formed at two specific locations near the center in the lengthwise direction of the top plate 9c of each of the left and right bezels 9b. The concave components 9d of the left and right bezels 9b fit into the concave components 5c of the top plates 5a of the lamp frames 5, respectively. The concave components 9d have screw insertion holes (e.g., third screw insertion holes) 9e for inserting the screws 12, respectively. The screw insertion holes 9e are punched out from bottom portions of the concave components 9d. As seen in FIG. 6, the concave components 9d are formed by making cuts 9g in corner bend portions extending from the top plates 9c of the bezels 9b to the side plates 9f, and bending the sheet metal between the cuts 9g inward in an L shape. The side plates 9f extend rearward of the rear frame 1 from outward edge portions of the top plates 9c of the bezels 9b, respectively. The concave components 1e, 5c and 9d are located inward of the rear frame 1 relative to the side plates 9f of the bezels, respectively.

The screw insertion holes 1f, 5d and 9e for inserting the screws 12 to attach the liquid crystal module 14 are punched out so that when the concave components 1e of the rear frame 1, the concave components 5c of the lamp frames 5, and the concave components 9d of the bezels 9b are fitted together in that order, center axes of the screw insertion holes 1f, 5d and 9e coincide with each other.

With the liquid crystal module 14, the top plates 5a of the lamp frames 5 and the top plates 9c of the left and right bezels 9b are superposed over the flanges 1d of the left and right side plates 1a of the rear frame 1. The concave components 5c of the top plates 5a of the lamp frames 5 are fitted into the concave components 1e of the flanges 1d. The concave components 9d of the top plates 9c of the bezels 9b are fitted into the concave components 5c of the top plates 5a of the lamp frames 5. Furthermore, the engagement openings 5e in the lamp frames 5 are engaged with the hooks 1g of the left and right side plates 1a of the rear frame 1 and temporarily fastened there. Moreover, as seen in FIG. 5, the top plates 5a of the lamp frames 5 and the top plates 9c of the bezels 9b are fastened together and fixed to the flanges 1d of the side plates 1a of the rear frame with the screws 10. When the components are thus fastened together and fixed with the screws 10, as seen in FIG. 4, the screw insertion holes 1f, 5d and 9e punched out from the bottom portions of the concave components 1e, 5c and 9d are superposed vertically, with their center axes coinciding with each other.

As seen in FIG. 7, with the liquid crystal module 14, the bosses 11a formed on the rear face of the front cabinet 11 of the display device 20 are fitted into the concave components 9d of the bezels 9b to perform approximate positioning. The liquid crystal module attachment screws 12 are inserted into the screw insertion holes 1f, 5d and 9e, and are threaded into the bosses 11a. As a result, secure attachment of the liquid crystal module 14 to the front cabinet 11 can be achieved without the use of the conventional attachment tabs. With the liquid crystal module 14, since the conventional attachment tabs of the conventional liquid crystal module that stick out from the conventional left and right bezels can be eliminated, there is no worry that the antistatic bag will be torn when the product is put into an antistatic bag and shipped. Furthermore, since the size of the liquid crystal module 14 is reduced by an amount corresponding to the elimination of the conventional attachment tabs, less storage space and so forth are needed, and the liquid crystal module 14 is also easier to handle. Also, since there is higher strength and stiffness at and near the specific locations where the concave components 1e, 5c and 9d are formed in the flanges 1d of the side plates 1a of the rear frame 1, the top plates 5a of the lamp frames 5, and the top plates 9c of the bezels 9b, respectively, there is no risk of deformation when the liquid crystal module 14 is screwed to the bosses 11a of the front cabinet 11 with the attachment screws 12.

With the liquid crystal module 14, the concave components 1e, 5c and 9d are formed at specific locations of the flanges 1d of the rear frame 1, the top plates 5a of the lamp frames 5 and the top plates 9c of the bezels 9b, respectively. The screw insertion holes 1f, 5d and 9e are punched out from the bottom portions of the concave components 1e, 5c and 9d. The concave components 5c of the top plates 5a of the lamp frames 5 are fitted into the concave components 1e of the flanges 1d. The concave components 9d of the top plates 9c of the bezels 9b are fitted into the concave components 5c of the top plates 5a of the lamp frames 5. Thus, an advantage is that there is higher strength and stiffness at and near the specific locations where the concave components 1e, 5c and 9d are formed in the flanges 1d, the top plates 5a of the lamp frames 5, and the top plates 9c of the bezels 9b, and there is no risk of deformation when the liquid crystal module 14 is screwed to the cabinet 15. Another advantage is that the work entailed by liquid crystal panel attachment is easier because the bosses 11a of the cabinet 15 in which screw holes are formed are fitted into the concave components 9d of the top plates 9c of the bezels 9b, and the liquid crystal panel 8 can be attached to the cabinet 15 by threading the screws 12 inserted from the screw insertion holes 1f, 5d and 9e into the screw holes in the bosses 11a while the liquid crystal module 14 and the cabinet 15 are still aligned.

With the liquid crystal module 14, the concave components 1e, 5c and 9d are each formed at two locations. However, if the front cabinet 11 has just one boss 11a on each of the left and right portions, then the concave components 1e, 5c and 9d can be formed on at least one location. Also, the concave components 1e, 5c, and 9d do not necessarily have to be formed. In this case, the screw insertion holes 1f, 5d, and 9e for inserting the liquid crystal module attachment screws 12 can just be punched out at specific locations in the flanges 1d of the side plates 1a of the rear frame 1, the top plates 5a of the lamp frames 5, and the top plates 9c of the bezels 9b such that their center axes coincide with each other.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment have been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A liquid crystal module comprising:
a rear frame including
   a bottom plate,
   a side plate that extends from a short side portion of the bottom plate in a forward direction of the rear frame relative to the bottom plate, and
   a flange that extends from a top edge portion of the side plate outward of the rear frame relative to the side plate, the flange having a first top surface that faces in the forward direction and a first concave component, the first concave component including a first bottom portion and a first screw insertion hole that is formed on the first bottom portion, the first bottom portion having a second top surface that faces in the forward direction and is recessed with respect to the first top surface of the flange;
a lamp frame fixedly attached to the rear frame along the side plate of the rear frame, the lamp frame having a lamp frame top plate that is disposed on the flange of the rear frame, the lamp frame top plate having a second screw insertion hole;
a liquid crystal panel disposed above the rear frame; and
a bezel disposed around an edge portion of the liquid crystal panel and fixedly attached to the rear frame, the bezel having a bezel top plate that is disposed on the lamp frame top plate of the lamp frame, the bezel top plate having a third screw insertion hole, the first, second and third screw insertion holes being aligned each other as viewed from a center axis of the first screw insertion hole.

2. The liquid crystal module according to claim 1, further comprising
a light reflecting sheet and a light source disposed within the rear frame, and
an optical sheet disposed above the light source.

3. The liquid crystal module according to claim 1, wherein the rear frame is integrally formed as a one-piece, unitary member.

4. The liquid crystal module according to claim 1, wherein the lamp frame top plate of the lamp frame further has a second concave component with a second bottom portion, the second screw insertion hole being formed on the second bottom portion of the second concave component, the second concave component of the lamp frame being fitted into the first concave component of the rear frame.

5. A liquid crystal module comprising:
a rear frame including
   a bottom plate,
   a side plate that extends from a short side portion of the bottom plate forward of the rear frame relative to the bottom plate, and
   a flange that extends from a top edge portion of the side plate outward of the rear frame relative to the side plate, the flange having a first screw insertion hole, the flange of the rear frame further having a first concave component with a first bottom portion, the first screw insertion hole being formed on the first bottom portion of the first concave component,
a lamp frame fixedly attached to the rear frame along the side plate of the rear frame, the lamp frame having a lamp frame top plate that is disposed on the flange of the rear frame, the lamp frame top plate having a second screw insertion hole, the lamp frame top plate of the lamp frame further having a second concave component with a second bottom portion, the second screw insertion hole being formed on the second bottom portion of the second concave component, the second concave component of the lamp frame being fitted into the first concave component of the rear frame
a liquid crystal panel disposed above the rear frame; and
a bezel disposed around an edge portion of the liquid crystal panel and fixedly attached to the rear frame, the bezel having a bezel top plate that is disposed on the lamp frame top plate of the lamp frame, the bezel top plate having a third screw insertion hole, the first, second and third screw insertion holes being aligned each other as viewed from a center axis of the first screw insertion hole, the bezel top plate of the bezel further having a third concave component with a third bottom portion, the third screw insertion hole being formed on the third bottom portion of the third concave component, the third concave component of the bezel being fitted into the second concave component of the lamp frame.

6. The liquid crystal module according to claim 5, wherein the bezel further has a bezel side plate that extends rearward of the rear frame from an outward edge portion of the bezel top plate, each of the first, second and third concave component being located inward of the rear frame relative to the bezel side plate.

7. A display device comprising:
a cabinet including a front cabinet and a rear cabinet, the front cabinet having a front panel and a boss with a threaded hole, the boss protruding rearward of the front cabinet relative to the front panel;
the liquid crystal module according to claim 4; and
a screw disposed through the first, second and third screw insertion holes, the screw being fastened to the threaded hole of the boss of the cabinet such that the liquid crystal module is fixedly coupled to the cabinet.

8. The display device according to claim 7, wherein the bezel further has a bezel side plate that extends rearward of the rear frame from an outward edge portion of the bezel top plate, each of the first, second and third concave component being located inward of the rear frame relative to the bezel side plate.

9. A display device comprising:
a cabinet including a front cabinet and a rear cabinet, the front cabinet having a front panel and a boss with a threaded hole, the boss protruding rearward of the front cabinet relative to the front panel;

a liquid crystal module housed within the cabinet, the liquid crystal module including a rear frame including
- a bottom plate,
- a side plate that extends from a short side portion of the bottom plate in a forward direction of the rear frame relative to the bottom plate, and
- a flange that extends from a top edge portion of the side plate outward of the rear frame relative to the side plate, the flange having a first top surface that faces in the forward direction and a first concave component, the first concave component including a first bottom portion and a first screw insertion hole that is formed on the first bottom portion, the first bottom portion having a second top surface that faces in the forward direction and is recessed with respect to the first top surface of the flange, a lamp frame fixedly attached to the rear frame along the side plate of the rear frame, the lamp frame having a lamp frame top plate that is disposed on the flange of the rear frame, the lamp frame top plate having a second screw insertion hole, a liquid crystal panel disposed above the rear frame, and a bezel disposed around an edge portion of the liquid crystal panel and fixedly attached to the rear frame, the bezel having a bezel top plate that is disposed on the lamp frame top plate of the lamp frame, the bezel top plate having a third screw insertion hole, the first, second and third screw insertion holes being aligned each other as viewed from a center axis of the first screw insertion hole; and a screw disposed through the first, second and third screw insertion holes, the screw being fastened to the threaded hole of the boss of the cabinet such that the liquid crystal module is fixedly coupled to the cabinet.

10. The display device according to claim 9, wherein the liquid crystal module further includes a light reflecting sheet and a light source that are disposed within the rear frame, and an optical sheet that is disposed above the light source.

11. The display device according to claim 6, wherein the rear frame is integrally formed as a one-piece, unitary member.

12. The display device according to claim 9, wherein the lamp frame top plate of the lamp frame further has a second concave component with a second bottom portion, the second screw insertion hole being formed on the second bottom portion of the second concave component, the second concave component of the lamp frame being fitted into the first concave component of the rear frame.

* * * * *